(12) United States Patent
Purdey

(10) Patent No.: US 8,075,251 B2
(45) Date of Patent: Dec. 13, 2011

(54) HYDRAULIC SEAL FOR A TURBOCHARGER

(75) Inventor: Matthew J Purdey, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 16 days.

(21) Appl. No.: 12/455,111

(22) Filed: May 28, 2009

(65) Prior Publication Data

US 2009/0238691 A1 Sep. 24, 2009

Related U.S. Application Data

(63) Continuation of application No. PCT/GB2007/004501, filed on Nov. 26, 2007.

(30) Foreign Application Priority Data

Nov. 28, 2006 (GB) .................................. 0623705.1

(51) Int. Cl.
*F16J 15/42* (2006.01)
(52) U.S. Cl. ........ 415/104; 417/407; 277/423; 277/433; 277/424; 277/428; 277/429; 415/230
(58) Field of Classification Search .................. 415/104, 415/229, 230; 417/405, 407; 277/423, 433, 277/424, 428, 429
See application file for complete search history.

(56) References Cited

U.S. PATENT DOCUMENTS

| 1,014,850 A | 1/1912 | Richardson |
| 2,823,052 A | 2/1958 | Collman |

(Continued)

FOREIGN PATENT DOCUMENTS

EP  0 420 786 A1  9/1990

(Continued)

OTHER PUBLICATIONS

International Search Report, PCT/GB/2007/004501, European Patent Office, May 15, 2008.

(Continued)

*Primary Examiner* — Edward Look
*Assistant Examiner* — Ryan Ellis
(74) *Attorney, Agent, or Firm* — Krieg DeVault LLP; Matthew D. Fair, Esq.

(57) ABSTRACT

A hydraulic seal is defined between a rotating member such as a turbocharger shaft and a stationary member such as part of a bearing housing of a turbocharger. The members define a projecting annular disc that is received in an annular channel that is filled with hydraulic sealing fluid such as oil. Rotation of the rotary member applies a centrifugal force to the fluid thereby ensuring that it is retained in the channel between walls thereof and the disc. This annulus of fluid provides a hydraulic seal around the shaft between the bearing housing and the compressor or turbine housing. The oil is delivered into the channel from a supply in the rotary member. One of the walls of the channel serves as a weir whereby when the channel has an excess supply of oil is overflows the wall and passes the drain. The arrangement provides an effective seal against blow-by across the turbine end seal and restricts gas flow from the relatively high pressure regions of the compressor and turbine housings into the relatively low pressure area of the bearing housing. It also ensures that there is a continuous flow of oil across the seal so as to prevent it degrading in the high temperature environment.

27 Claims, 4 Drawing Sheets

U.S. PATENT DOCUMENTS

| | | | |
|---|---|---|---|
| 3,455,561 A * | 7/1969 | Rinker et al. | 277/427 |
| 4,397,795 A | 8/1983 | Jackson | |
| 6,568,688 B1 | 5/2003 | Boeck | |
| 6,629,816 B2 * | 10/2003 | Langston et al. | 415/111 |
| 6,921,079 B2 * | 7/2005 | Rensch | 277/428 |
| 2004/0179935 A1 * | 9/2004 | Maguire | 415/111 |
| 2007/0092387 A1 * | 4/2007 | Ward | 417/407 |

FOREIGN PATENT DOCUMENTS

| | | |
|---|---|---|
| EP | 1 045 178 A2 | 10/2000 |
| EP | 1 387 061 A2 | 2/2004 |
| EP | 1 394 451 A1 | 3/2004 |
| EP | 1 531 295 A1 | 5/2005 |
| EP | 1 626 164 A1 | 2/2006 |
| FR | 2 621 970 | 4/1989 |
| GB | 972907 | 10/1964 |
| GB | 1 284 596 A | 8/1972 |
| GB | 2 055 159 A | 2/1981 |
| GB | 2 420 602 A | 5/2006 |
| JP | 51 42855 A | 4/1976 |
| JP | 2003 148632 A | 5/2003 |
| WO | WO 2006/059995 A1 | 6/2006 |

OTHER PUBLICATIONS

GB Search Report, GB 0623705.1, Mar. 8, 2007.

* cited by examiner

HYDRAULIC SEAL FOR A TURBOCHARGER

CROSS REFERENCE TO RELATED APPLICATIONS

The present application is a continuation of PCT/GB2007/004501 filed Nov. 26, 2007 which claims priority to United Kingdom Patent Application No. GB0623705.1, filed Nov. 28, 2006, each of which is incorporated herein by reference.

FIELD OF THE INVENTION

The present invention relates to a hydraulic seal particularly, but not exclusively, in a turbocharger for an internal combustion engine. In particular, the present invention relates to such a seal for the reduction of blow-by gases from a turbocharger turbine or compressor housing into a turbocharger bearing housing.

BACKGROUND

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. It is well known that providing an effective sealing system to prevent oil leakage from the central bearing housing into the compressor or turbine housing is problematic. Oil leakage is regarded as a particular problem at the compressor end of the turbocharger since at low boost pressures (e.g. when the engine is idling) there can be a significant drop in pressure from the bearing housing to the compressor housing which encourages oil leakage into the compressor housing. It is for instance conventional to include an oil slinger in the compressor end seal assembly. An oil slinger is an annular component which rotates with the turbocharger shaft and has surfaces or passages arranged for propelling oil away from the shaft as it rotates, and in particular from the passage through the bearing housing into the compressor housing.

It is moreover important for a sealing arrangement to be able to withstand the increasingly high boost pressures that are delivered by modern turbochargers. The pressure of the bearing housing is effectively at the same pressure as the engine oil sump (typically around up to 100 millibar) and there is thus a pressure gradient between the bearing housing and the compressor and turbine housings. A significant pressure differential can also be set up between the bearing and turbine housing when an exhaust gas engine braking arrangement is employed at the turbine outlet as this creates back pressure. The sealing arrangement must thus be able to restrict "blow-by" gas flow from the relatively high pressure regions of the turbine and compressor housings into the relatively low pressure region of the bearing housing, without impairing its ability to restrict oil leakage.

Although oil leakage at the turbine end of the turbocharger is regarded as less of a problem, it is nevertheless important to prevent oil leaking into the turbine housing where it will mix with the exhaust gas and increase exhaust emissions. The turbocharger turbine wheel is conventionally welded to a seal boss at the end of the turbocharger shaft. In existing turbocharger bearing housings sealing is typically provided by one or more sealing rings (a piston-type rings) seated in annular grooves defined in an outer surface of the shaft or in the housing and which serve to restrict gas flow between the housing and the shaft in a direction in or out of the bearing housing. A rotating surface perpendicular to the shaft is provided to sling oil and so control oil leakage.

In addition to the blow-by gases referred to above, as the sealing efficiency of the engine piston rings decreases additional blow-by exhaust gases enter the crankcase and increase its internal pressure. Such an increase in crankcase pressure is transmitted to the bearing housing of the turbocharger as the two are connected by virtue of the bearing oil from the turbocharger draining back to the crankcase. Exhaust gases can thus enter the bearing housing, become entrained with the oil and "blow-by" the turbine end seal. With increasingly stringent exhaust emission regulations there are restrictions on venting such gases to atmosphere and there is a continuing need to improve the efficiency of the turbine end seal arrangement.

An example of a known oil seal arrangement is shown in our European patent application published under no. EP 1387061.

Rotating hydraulic seals for sealing rotating shafts by making use of the centrifugal force acting on the hydraulic fluid have been known for some time. An example is disclosed in U.S. Pat. No. 1,014,850. In short, an annular channel defined by a fixed structure is penetrated by a thin disc or plate defined on the rotating shaft (or vice versa). Oil is maintained in the channel by centrifugal forces generated by the rotating disc or channel and provides a seal between the two. However, such seals have not been thought suitable for use in the hot environment of a turbocharger. The very high rotation speeds of a turbocharger (up to 150,000 r.p.m.) would cause extremely high shear rates in the sealing oil and thereby raise its temperature to a level where there is a risk of breakdown by coking.

SUMMARY

One of the objects of the present invention, amongst others, is to provide an improved sealing assembly that obviates or mitigates one or more of the aforementioned (and other) problems.

According to a first aspect of the present invention there is provided a hydraulic seal assembly comprising a rotary member that is rotatable about an axis of rotation and a fixed member, one of said members defining an annular projection and the other defining a radially inward open annular channel in which said projection is received such that it defines a clearance between the members for receipt of hydraulic sealing fluid, whereby rotation of the rotary member imparts a centrifugal force to the fluid, when present, so as to maintain an annulus of sealing fluid in the clearance, a sealing fluid supply for delivering sealing fluid to said channel, the supply defining a fluid inlet at which the fluid may enter the channel, the inlet being disposed in said channel at a first distance from said axis of rotation, wherein the channel is defined between a base wall and first and second substantially opposite walls that extend from the base wall towards the axis of rotation, and a sealing fluid exit in or at an end of said first wall, the inlet and exit being axially offset.

This arrangement of the supply fluid inlet and the exit in the centrifugal type hydraulic seal ensures that there is a continuous flow of sealing fluid in the channel thereby prevent the temperature of the fluid reaching a value where it might degrade by, for example, coking. In particular, the axial offset encourages the fluid to pass over the annular projection in the direction of a pressure gradient across it. Similarly, such flow is encouraged by the position of the fluid exit radially inboard of the base wall of the channel. By positioning the fluid supply inlet in the channel the sealing fluid enters the channel directly so as to improve the efficiency of the sealing operation. The arrangement also allows the pressure of the fluid in the channel to increase with the rotational speed of the rotating member in which case the fluid can be delivered to the supply at relatively low pressures.

The exit may be at a second distance from the axis of rotation, the second distance being shorter than said first distance. The greater this distance, the greater the sealing capacity.

The rotary member may define the channel and the fixed member may define the annular projection or vice versa.

The first wall may terminate at an end that is proximate the axis of rotation, the exit being provided adjacent to said end such that when there is excess sealing fluid present in said channel it overflows said end to said exit. Thus the exit may be provided simply by termination of the first wall or by an opening or slot in the wall.

The first wall may be shorter than said second wall.

The rotary member may be integral with a rotary shaft or may be fixed to the shaft for rotation therewith.

The sealing fluid supply may comprise a passage in the rotary member that emerges at said inlet. The passage may extend, at least in part, in a substantially radial direction.

The inlet may be at a periphery of the annular projection or in the base wall of the channel. Alternatively it may be in, or opposite, said second wall of the channel.

The first and second walls may be defined by separate components.

The annular projection may be a disc.

The seal assembly may be provided in a housing which defines a drain for receipt of sealing fluid that emerges from said exit.

The rotary member effectively also serves as a slinger for directing hydraulic sealing fluid away from a predetermined location.

The rotary member may define the annular projection.

The rotary member may be supported on said shaft in a fixed relationship. There may be an undercut at a base of the annular projection for receipt of sealing fluid from the channel when the member stops rotating. A sealing ring may be provided between the rotary member and the fixed member. The undercut may be provided between said annular projection and said sealing ring.

A sealing fluid drain passage may be provided in the channel of the fixed member.

The rotary member may comprise a sleeve from which the annular projection extends, the supply passage extending through said sleeve from an end face thereof and substantially radially outwards through said projection.

According to a second aspect of the present invention there is provided a rotary member that is rotatable about a rotational axis and a fixed member one of which defines an annular projection and the other of which defines an annular channel in which said projection is received with a clearance for receipt of hydraulic sealing fluid such that rotation of the rotating member generates a centrifugal force in the fluid so as to maintain an annulus of sealing fluid in the clearance, wherein a fluid supply passage is defined in the rotary member for carrying sealing fluid to the channel.

The passage may extend, at least in part, in a substantially radial direction.

The passage may have an opening at, or adjacent to, a periphery of the annular projection that serves as a fluid inlet to said channel.

The channel may be defined by a base wall and opposed side walls and said fluid inlet is in or faces one of said side walls.

According to a third aspect of the present invention there is provided a turbocharger comprising:

a turbine wheel provided at one end of a shaft for rotation about an axis within a turbine housing;

a compressor wheel mounted to the other end of the shaft for rotation about said axis within a compressor housing;

the shaft rotating on bearing assemblies housed within a bearing housing located between the compressor housing and the turbine housing and provided with oil passages for delivering oil to the bearing assemblies;

an hydraulic seal assembly as defined above and arranged in said bearing housing around said shaft between at least one bearing assembly and the adjacent compressor or turbine housing, the hydraulic sealing fluid being oil.

The provision of such a hydraulic seal in a turbocharger serves to isolate the bearing housing from the turbine and compressor housings. In particular such a seal is able to withstand the large pressure gradients across the bearing and either the compressor or turbine houses generated by the higher boost pressures of modern turbochargers, particularly those that have multiple stages and/or by exhaust gas braking systems. Furthermore, such a seal is able to eliminate blow-by at high rotational speeds.

There may be a thrust bearing assembly provided adjacent to said hydraulic seal assembly. An oil inlet to said supply may be provided. The inlet being configured to receive oil from the thrust bearing assembly. The thrust bearing assembly may have an oil passage therethrough and may communicate with said oil inlet and an oil supply passage in the bearing housing.

The thrust bearing assembly may comprise inner and outer concentric members, said inner member being fixed to said shaft for rotation therewith and said outer member being fixed to said bearing housing.

An annular clearance may be provided between said inner and outer members, which clearance is open to said oil inlet of the seal assembly. The outer member may have an oil passage therethrough for delivering oil from a supply passage in the housing to the annular clearance between the inner and outer members of the thrust assembly. The oil passage in the outer member may have a side port for communication with said oil supply passage in the bearing housing.

The inner member may be a bush having a radially outward extending flange that abuts said outer member.

The shaft may be stepped and the inner member may abut said step.

The channel may be defined between a wall defined by part of bearing housing and a wall defined by an annular member fitted into a recess in the bearing housing.

BRIEF DESCRIPTION OF THE DRAWINGS

Specific embodiments of the present invention will now be described, by way of example only, with reference to the accompanying drawings, in which.

DETAILED DESCRIPTION

Figure 1:
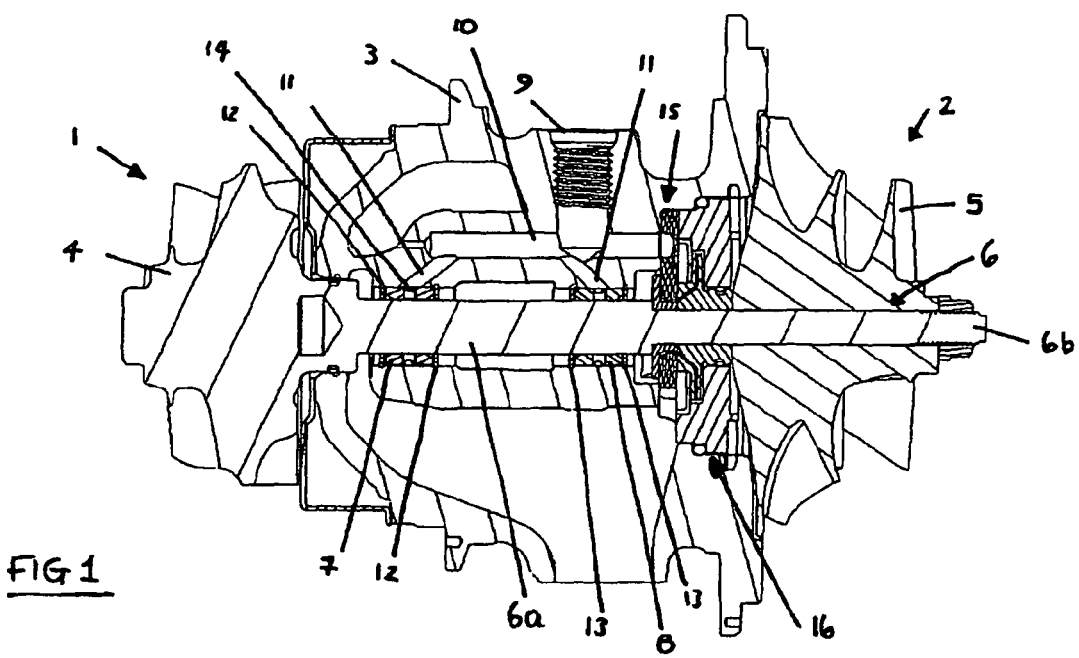
FIG. 1 is a cross-section through an embodiment of the turbocharger in accordance with the present invention with compressor and turbine housings removed.

Referring to FIG. 1, the illustrated turbocharger comprises a turbine 1 joined to a compressor 2 via a central bearing housing 3. The turbine 1 comprises a turbine wheel 4 rotating within a turbine housing (not shown). Similarly, the compressor 2 comprises a compressor wheel 5 that rotates within a compressor housing (not shown). The turbine wheel 4 and compressor wheel 5 are mounted on opposite ends of a common turbocharger shaft 6 that extends through the central bearing housing 3.

In use, the turbine wheel 4 is rotated by the passage of exhaust gas passing over it from the internal combustion engine. This in turn rotates the compressor wheel 5 that draws intake air through a compressor inlet and delivers boost air to the inlet manifold of an internal combustion engine via an outlet volute (not shown).

The turbocharger shaft 6 rotates on fully floating journal bearings 7 and 8 housed towards the turbine end and compressor end respectively of the bearing housing 3. Oil is fed to the bearings under pressure from the oil system of the engine via an oil inlet 9, gallery 10 and passages 11. Each journal bearing 7,8 is retained in place by circlips 12 and 13 and is provided with circumferentially spaced radial holes 14 for oil to pass to the turbocharger shaft 6. The oil drains out of the bearings and returns to the engine sump as will be described below.

Figure 2:
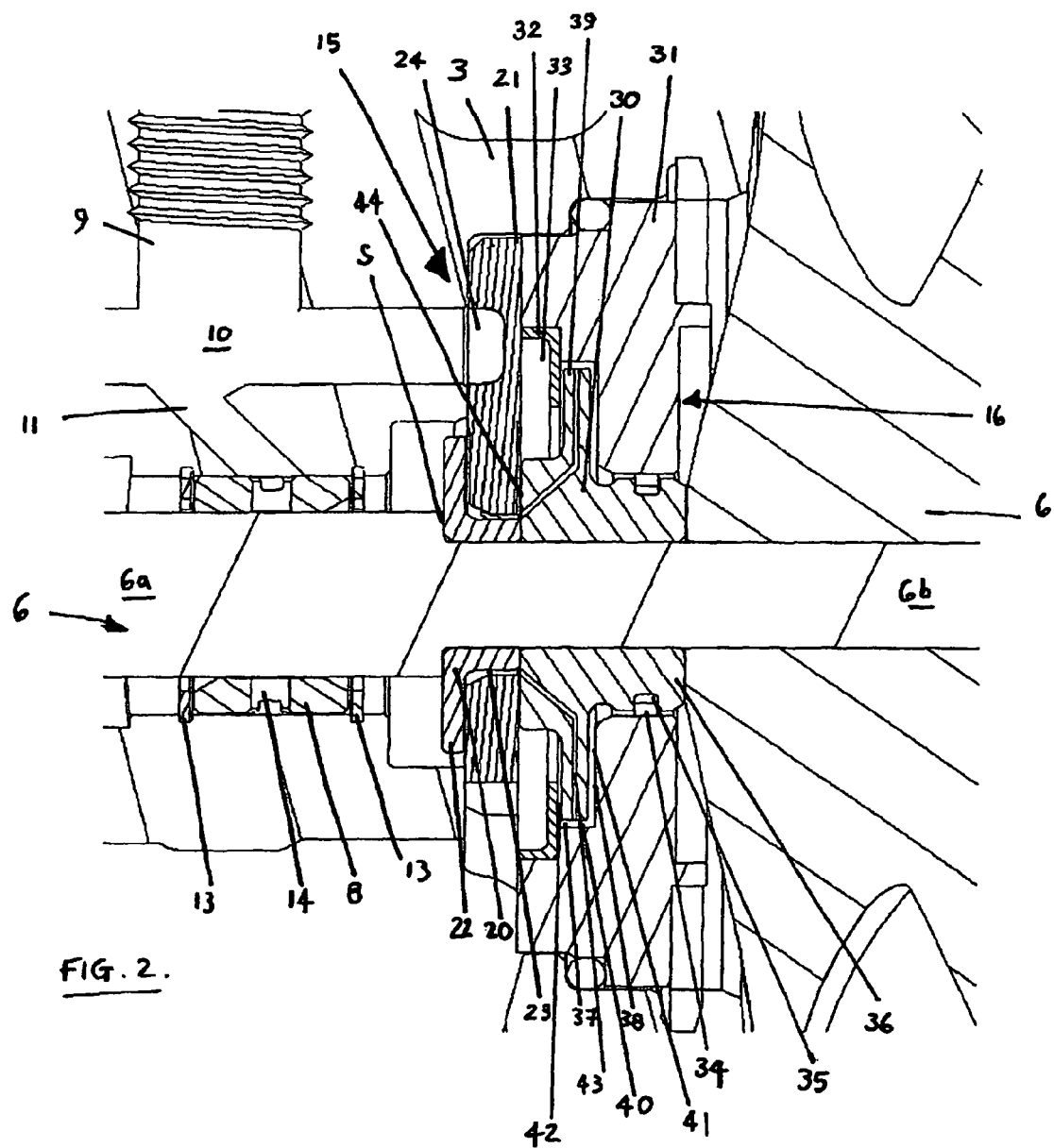
FIG. 2 is an enlarged view part of the turbocharger of FIG. 1, showing an oil seal assembly and a thrust beating assembly.

The turbocharger shaft 6 is stepped to form two portions: a first portion 6a of a first diameter that supports the turbine wheel 4 and both journal bearings 7, 8; and a second portion 6b of a second diameter, less than said first diameter, that supports a thrust bearing assembly 15 and an oil seal assembly 16 which interact with one another. The thrust bearing and oil seal assembly flank the journal bearing 8 at the compressor end and are shown in greater detail in FIG. 2.

The thrust bearing assembly 15 comprises a thrust bush 20 fixed concentrically on the shaft 6 so that it rotates therewith and a radially outboard thrust washer 21 that is fixed to the bearing housing 3 such that it does not rotate. The bush abuts against the step S between the two portions 6a, 6b of the turbocharger shaft 6 and has a radially outward extending flange 22. The thrust washer 21 is concentrically disposed over the bush 20, to one side of the flange 22, with a small annular clearance 23 and is penetrated by an internal radially extending oil passage 21a (hidden in FIG. 2, but shown in dotted line in FIG. 4). In operation an axial force acting on the shaft in the direction from left to right in the figures is resisted by the thrust bearing assembly and in particular by the flange 22 of the bush abutting the thrust washer 21. Oil is delivered into the oil passage 21a through side port 24 in the washer that interfaces with the passage 10 in the bearing housing 3. Thus pressurised oil from the bearing housing supply 9,10 is carried through the thrust washer 21 towards the annular clearance 23 so as to lubricate the abutting surfaces of thrust bearing assembly 15. This is illustrated by the arrows in the schematic diagram of FIG. 4.

The oil seal assembly 16 comprises a rotary member 30 fixed to the shaft, a stationary sealing body 31 that is fixed within the bearing housing 3 and disposed concentrically around the rotary member 30, and an annular member 32 that is press-fit into a recess 33 in the sealing body 31.

The sealing body 31 is designed to seal the bearing housing 3 at a location immediately adjacent to the compressor housing. A first seal is provided by a sealing ring 34 that is supported by the body 31 and projects into an annular groove 35 defined in a sleeve part 36 of the rotary member 30 that is concentrically supported on the shaft 6 at the compressor end. The sealing body 31 has an annular recess 33 that supports the annular member 32 and an adjacent annular channel 37 defined between a radial wall of the annular member 32 and a parallel radial wall 38 of the sealing body, with the annular member 32 being shorter in radial length than the radial wall 38 of the sealing body. An annular disc 39 of the rotary member 30 projects radially outwards from the sleeve 36 into the channel 37 to form a second seal as will be described below. In order to allow relative rotation there is a narrow clearance between the disc 39 and the surfaces that define the channel 37, including a radial clearance 40 between the peripheral tip of the disc 39 and the facing surface of the body (forming a base wall of the channel) and axial clearances 41, 42 between the side faces of the disc 39 and the opposed parallel surfaces of the body 31 and the annular member 32. The disc 39 of the rotary member is penetrated by a small-bore passage 43 that connects the radial clearance at the disc tip with the annular clearance between the thrust bush 23 and washer 21. The passage 43 extends radially inside the disc 39 and then extends in a direction with both axial and radial components through the sleeve 36 to emerge through a side face thereof 44 and meet the clearance 23 in the thrust bearing assembly 15.

Figure 4:
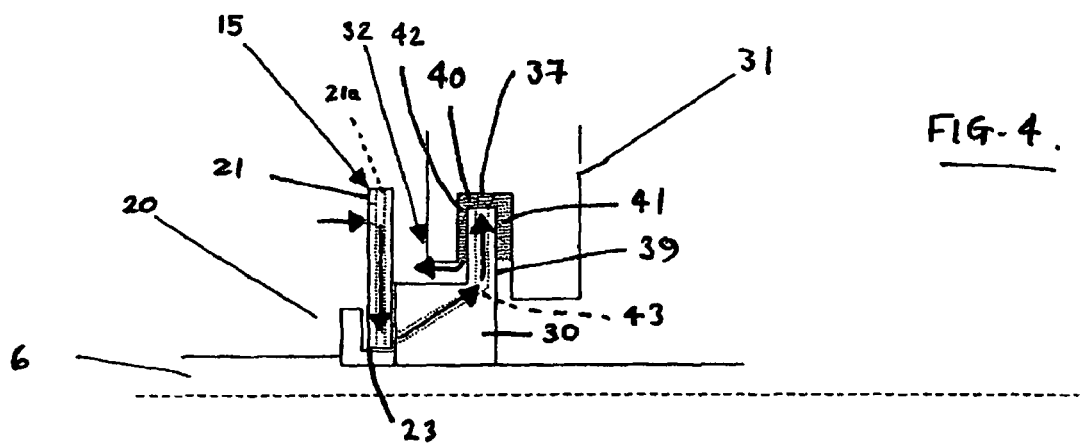
FIG. 4 is a schematic representation of the oil seal and thrust beating assembly of FIG. 2 illustrating its operation.

In operation, engine oil is delivered to the thrust bearing assembly 15 through the oil passage 21a in the thrust washer and collects in the annular clearance 23 in the thrust bearing assembly 15. From there it enters the adjacent passage 43 in the rotary member. Rotation of the member 30 with the shaft 6 imparts a centrifugal force to the oil thereby forcing it outwards along the passage 43 in the disc 39 to the tip where it emerges into the channel 37. The oil collects on both sides of the disc 39 in the radial and axial clearances 40, 41, 42 between the tip and the walls of the channel 37 as shown in FIG. 4. As the speed of rotation of the shaft increases the centrifugal force increases and the pressure of the oil in the channel 37 increases with the square of the speed. If the gas pressure on, for example, the compressor side of the seal increases it acts on the column of oil in the axial clearance 41 and may reduce its length and increase the column of oil in the other axial clearance 42. However, the forces generated by rotation and the gas pressure acting on the column of oil in the axial clearance 42 may restore both columns to equal lengths on both sides of the disc 39. An effective hydraulic seal is thereby provided. The radial length of the annular member 32 on one side of the channel 37 is shorter than the corresponding length of the radial wall 38 of the sealing body 31 on the other side and thus when the channel is filled with oil it overflows the end of the radial wall of the annular member 32 in the manner of a weir. The overflowing oil is disperses towards the conventional bearing housing drain of the turbocharger.

The above-described arrangement provides for a constant flow of oil from the engine through the thrust bearing assembly 15, the disc 39 of the rotary member 30 and into the channel 37 of the seal assembly, as is illustrated schematically in FIG. 4. The oil is supplied to the channel at a position that is radially outboard of the weir. Once it occupies the channel 37, the oil flows from the relatively high pressure region on the compressor side of the disc 39, over the weir provided by the end of the annular member 32 to the relatively low pressure region in the bearing housing. This constant replacement of oil ensures that it remains cool. If necessary an oil drain bore 50 is provided in the bearing housing (as shown in FIG. 3) to improve the oil circulation.

Figure 3:
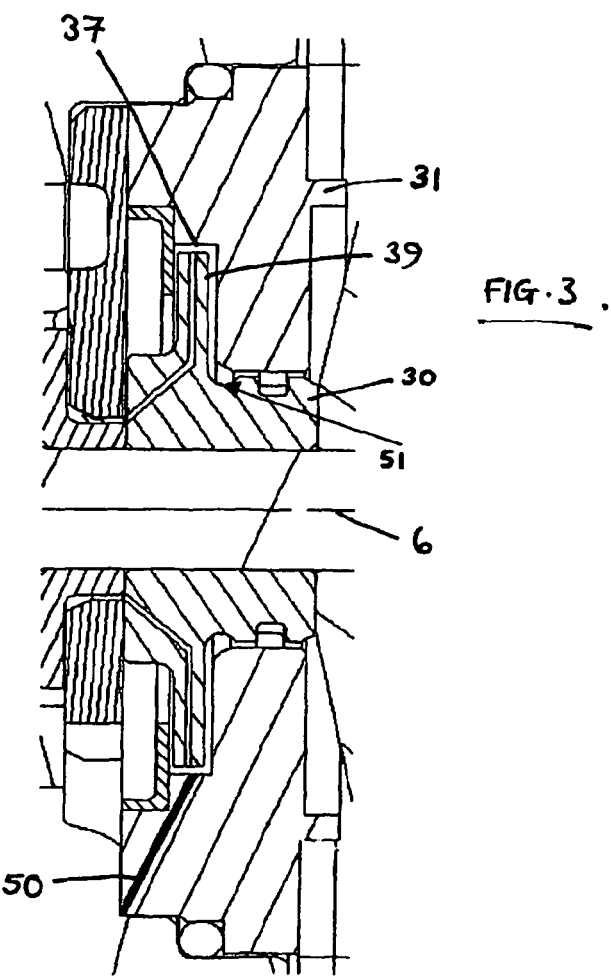
FIG. 3 illustrates a modified embodiment of the assembly of FIG. 2 in accordance with the present invention.

In FIG. 3 the rotary member 30 is provided with an undercut 51 at the base of the disc 39 on the compressor side. This allows any oil draining from the channel 37 towards the compressor side when rotation stops to be carried away to the bearing housing drain bore 50.

The flow of oil serves to dissipate heat and degradation of the oil in this high temperature environment by coking or the like is prevented. The rate of flow is dependent on the difference in radial distance from the annular clearance 23 in the thrust assembly and the weir returning oil to the bearing housing, the diameter of the rotary seal member 30 and diameter at which the oil is supplied to the seal. The provision of a wall 32 of the channel 37 serving as a weir ensures that the arrangement is self-regulating in that excess oil simply overflows the weir and drains away. Moreover, it is not prone to clogging through particulate matter or foreign bodies becoming entrained in the oil.

The hydraulic seal with recirculating oil allows much high pressure differences between a turbocharger bearing housing 3 and either the compressor or turbine housing and eliminates blow by at high rotational speeds solving a significant difficulty particularly in two stage turbocharger systems where boost pressures can reach 4 bar and will increase as higher demands are made by customers.

Figure 4A:
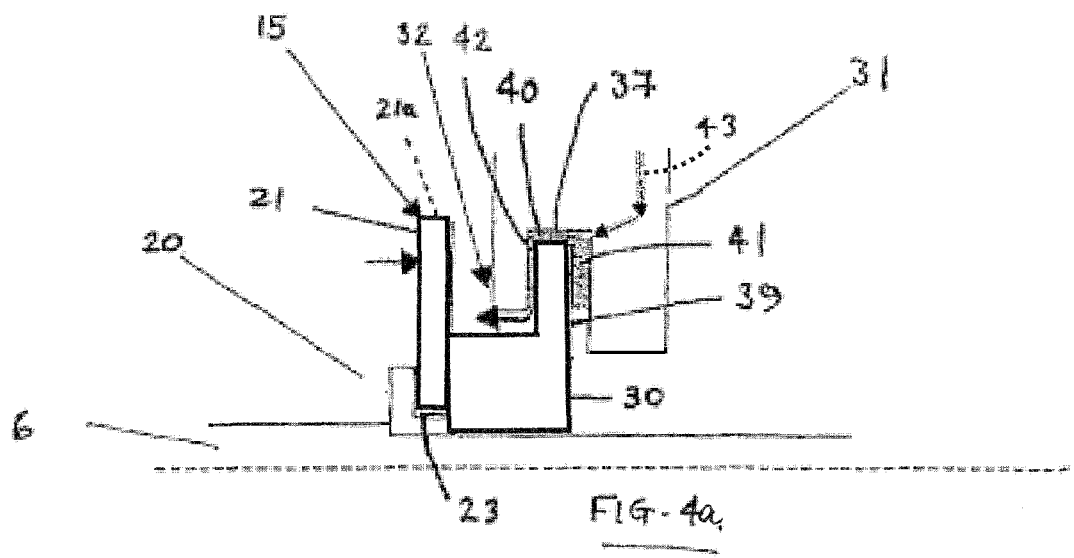
FIG. 4a is a schematic representation of the oil seal and thrust bearing assembly.
Figure 4B:
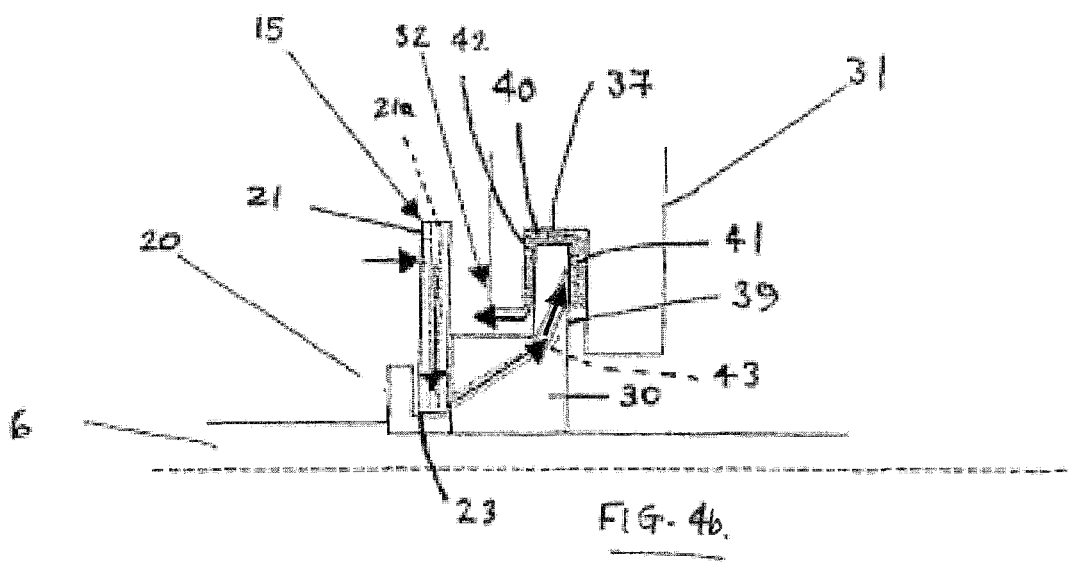
FIG. 4b is a schematic representation depicting the supply of oil to the channel in the alternative embodiment of FIG. 5.

In an alternative embodiment (as shown in FIG. 4b) the small bore passage 43 in the sealing body may emerge through a side wall of the disc 39 rather than at its tip. If this provided on the compressor side it ensures that more oil is recirculated around the disc 39 and over the weir to drain.

The rotary member serves as an oil slinger or thrower for directing oil away from the compressor housing and as such eliminates the need for a separate slinger component. Such slingers will be well known to the person skilled in the art and typically comprise a flange or annular portion that has a surface for propelling the surrounding lubricating oil away from a shaft during its rotation so as to prevent oil from flowing towards sealing rings from whence it may leak. These often form part of the thrust bearing arrangement and thus in the above described design the rotary member also serves as part of the thrust bearing arrangement.

Figure 5:
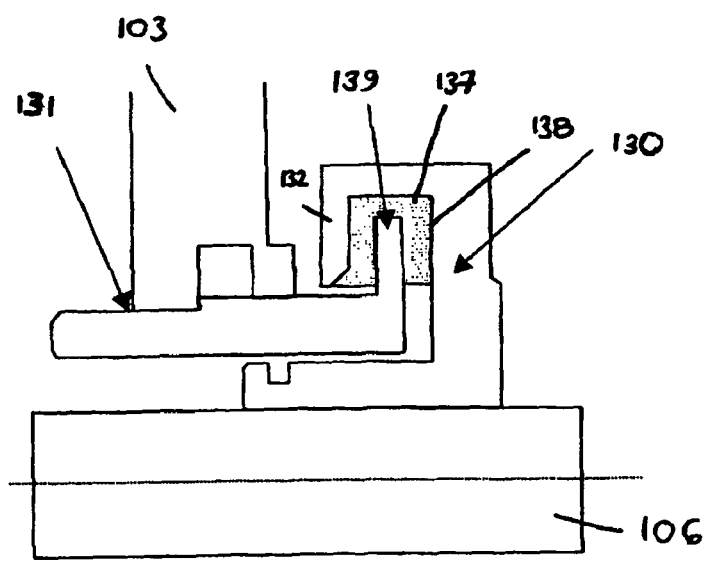
FIG. 5 is a schematic representation of an alternative embodiment of the oil seal assembly in accordance with the present invention.

FIG. 5 shows an alternative embodiment in which components common to the embodiments of FIGS. 1 to 4 have been given the same reference numbers but increased by 100 and are not further described except in so far as they differ from their counterparts in FIGS. 1 to 4. The annular disc 139 in this embodiment is provided on a fixed component 131 connected to the bearing housing structure 103 and the channel 137 is provided on a rotary member 130 that is fixed to shaft 106. Again, one wall 132 of the channel is shorter than the other 138 to provide a weir that allows constant flow of the oil to drain. The oil may be supplied to the channel 137 via an internal passage (as shown FIG. 4a) in the fixed member 131 or the rotary member 130. In the latter case the passage extends from a point near the shaft such that centrifugal force acting on the oil through rotation of the rotary member serves to force it radially outwards through the passage to the channel.

It will be appreciated that the oil seal arrangement may be provided between the bearing housing and the turbine housing in addition to or instead of the compressor housing. Moreover, the seal arrangement may be used to seal a rotating member to a non-rotating member in any application.

It is to be appreciated that numerous modifications to the above-described embodiments may be made without departing from the scope of the invention as defined in the appended claims. For example, it will be understood that the precise shape and configuration of the components that make up the thrust bearing assembly and the seal assembly may vary.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbocharger comprising:
    a turbine wheel provided at one end of a shaft for rotation about an axis within a turbine housing;
    a compressor wheel mounted to the other end of the shaft for rotation about said axis within a compressor housing;
    the shaft rotating on bearing assemblies housed within a bearing housing located between the compressor housing and the turbine housing and provided with oil passages for delivering oil to the bearing assemblies;
    an hydraulic seal assembly arranged in said bearing housing around said shaft between at least one bearing assembly and the adjacent compressor or turbine housing, the hydraulic sealing fluid being oil;
    the hydraulic seal assembly comprising a rotary member that is rotatable about the axis and a fixed member, one of said members defining an annular projection and the other defining a radially inward open annular channel in which said projection is received such that it defines a clearance between the members for receipt of hydraulic sealing fluid, whereby rotation of the rotary member imparts a centrifugal force to the fluid, when present, so as to maintain an annulus of sealing fluid in the clearance, a sealing fluid supply for delivering sealing fluid to said channel, the supply defining a fluid inlet at which the fluid may enter the channel, the inlet being disposed in said channel at a first distance from said axis of rotation, wherein the channel is defined between a base wall and first and second substantially opposite walls that extend from the base wall towards the axis of rotation, and a sealing fluid exit in or at an end of said first wall, the inlet and exit being axially offset;
    a thrust bearing assembly adjacent to said hydraulic seal assembly;

the hydraulic seal assembly having an oil supply inlet that is configured to receive oil from the thrust bearing assembly.

2. A turbocharger assembly according to claim 1, wherein thrust bearing assembly has an oil passage therethrough and which communicates with said oil supply inlet and an oil supply passage in the bearing housing.

3. A turbocharger according to claim 2, wherein the thrust bearing assembly comprises inner and outer concentric members, said inner member being fixed to said shaft for rotation therewith and said outer member being fixed to said bearing housing.

4. A turbocharger according to claim 3, wherein there is an annular clearance between said inner and outer members, which clearance is open to said oil supply inlet of the seal assembly.

5. A turbocharger according to claim 4, wherein the outer member has an oil passage therethrough for delivering oil from a supply passage in the housing to the annular clearance between the inner and outer members of the thrust assembly.

6. A turbocharger according to claim 5, wherein the oil passage in the outer member has a side port for communication with said oil supply passage in the bearing housing.

7. A turbocharger according to claim 3, wherein the inner member is a bush having a radially outward extending flange that abuts said outer member.

8. A turbocharger according to claim 1, wherein said shaft is stepped and the inner member abuts against said step.

9. A turbocharger according to claim 1, wherein the channel is defined between a wall defined by part of bearing housing and a wall defined by an annular member fitted into a recess in the bearing housing.

10. A turbocharger according to claim 1, wherein the oil circulates through the channel from a high pressure side to a low pressure side at which the exit is located.

11. A hydraulic seal assembly comprising a rotary member that is rotatable about an axis of rotation and a fixed member, the rotary member defining an annular projection and the fixed member defining a radially inward open annular channel in which said annular projection is received such that it defines a clearance between the members for receipt of hydraulic sealing fluid, whereby rotation of the rotary member imparts a centrifugal force to the fluid, when present, so as to maintain an annulus of sealing fluid in the clearance, a sealing fluid supply for delivering sealing fluid to said channel, the supply defining a fluid inlet at which the fluid may enter the channel, the inlet being disposed in said channel at a first distance from said axis of rotation, wherein the channel is defined between a base wall and first and second substantially opposite walls that extend from the base wall towards the axis of rotation, and a sealing fluid exit in or at an end of said first wall, the inlet and exit being axially offset, wherein the rotary member comprises a sleeve from which the annular projection extends, wherein the fluid inlet is configured to receive fluid from a thrust bearing assembly adjacent to said hydraulic seal assembly.

12. A hydraulic seal according to claim 11, wherein the sealing fluid supply extends through said sleeve from an end face thereof and substantially radially outwards through said projection.

13. A hydraulic seal assembly according to claim 11, where the exit is at a second distance from the axis of rotation, the second distance being shorter than said first distance.

14. A hydraulic seal assembly according to claim 11, wherein the first wall terminates at an end that is proximate the axis of rotation, the exit being provided at said end such that when there is excess sealing fluid present in said channel it overflows said end to said exit.

15. A hydraulic seal assembly according to claim 14, wherein the first wall is shorter than said second wall.

16. A hydraulic seal assembly according to claim 11, wherein the rotary member is integral with, or fixed to a rotary shaft.

17. A hydraulic seal assembly according to claim 11, wherein the sealing fluid supply comprises a passage in the rotary member that emerges at said inlet.

18. A hydraulic seal assembly according to claim 17, wherein the passage extends in a substantially radial direction.

19. A hydraulic seal assembly according to claim 11, wherein the inlet is at a periphery of the annular projection or the base wall of the channel.

20. A hydraulic seal assembly according to claim 11, wherein the inlet is in, or opposite, one of said first and said second walls of the channel.

21. A hydraulic seal assembly according to claim 11, wherein the annular projection is a disc.

22. A hydraulic seal assembly according claim 11, wherein the rotary member also defines a slinger for directing hydraulic sealing fluid away from a predetermined location.

23. A hydraulic seal assembly according to claim 11, wherein the rotary member is supported on said shaft in a fixed relationship.

24. A hydraulic seal assembly according to claim 11, wherein there is provided an undercut at a base of the annular projection for receipt of sealing fluid from the channel when the member stops rotating.

25. A hydraulic seal according to claim 24, wherein there is provided a sealing ring between the rotary member and the fixed member.

26. A hydraulic seal assembly according to claim 25, wherein said undercut is between said annular projection and said sealing ring.

27. A hydraulic seal according to claim 11, wherein there is provided a sealing fluid drain passage in the channel of the fixed member.

* * * * *